(12) United States Patent
Furukawa

(10) Patent No.: US 6,526,171 B1
(45) Date of Patent: Feb. 25, 2003

(54) IMAGE OBJECT MANAGING METHOD, AN IMAGE PROCESSING APPARATUS USING SAID METHOD, AND A RECORDING MEDIA FOR PROGRAMS ACHIEVING THE SAME

(75) Inventor: Isao Furukawa, Ebina (JP)

(73) Assignee: Hitachi, ltd., Tokyo (JP)

( * ) Notice: Subject to any disclaimer, the term of this patent is extended or adjusted under 35 U.S.C. 154(b) by 0 days.

(21) Appl. No.: 09/343,216

(22) Filed: Jun. 30, 1999

(30) Foreign Application Priority Data

Jul. 1, 1998 (JP) .......................................... 10-185846

(51) Int. Cl.$^7$ ................................................ G06K 9/46
(52) U.S. Cl. ........................................... 382/232; 707/1
(58) Field of Search ................................. 382/100, 232, 382/233, 276, 210, 212; 235/380; 283/70; 380/54, 255; 705/54; 707/100, 1; 713/175–176, 200

(56) References Cited

U.S. PATENT DOCUMENTS 5,493,677 A * 2/1996 Balogh et al. ............ 707/104.1
5,687,236 A * 11/1997 Moskowitz et al. ........... 380/28
5,761,686 A * 6/1998 Bloomberg .................. 707/529
5,822,436 A * 10/1998 Rhoads ......................... 380/54
5,875,249 A * 2/1999 Mintzer et al. ................ 380/54
6,112,181 A * 8/2000 Shear et al. .................... 705/1
6,122,403 A * 9/2000 Rhoads ....................... 382/233

* cited by examiner

Primary Examiner—Jayanti K. Patel
(74) Attorney, Agent, or Firm—Antonelli, Terry, Stout & Kraus, LLP

(57) ABSTRACT

In an image object managing technology, a copyright and a right of portraits of images such as mobile pictures can be easily managed. When a producer creates a stream of video images, an identical identifier is assigned in all video images, in response to indication from the producer, to object streams of objects which is regarded as identical by the producer. To retrieve a particular object later from the video stream, the particular key assigned in the creation of the video stream is employed as a retrieval key. The object stream includes an encryption field. Using an encryption key only known by the producer, at least part of data of the identifier or data field is encrypted to be written in the encryption field. An identifier extracted from data obtained by decoding the encryption field using the encryption key is compared with an identifier in the object stream to thereby detect modification of the identifier.

10 Claims, 13 Drawing Sheets

FIG.12

| x | Meaning |
|---|---|
| 1 | Mod (7,n) |
| 2 | Quotient (7,n) |

FIG.13

| f (1,n) | Meaning |
|---|---|
| 1 | Hokkaidō |
| 2 | Tōhoku |
| 3 | Kantō |
| 4 | Chūbu |
| 5 | Chūgoku |
| 6 | Shikoku |
| 0 | Kyūshu |

FIG.14

| f (2,n) | Meaning |
|---|---|
| 0 | Weather mark |
| 1 | Temperature |
| 2 | Wave mark |

IMAGE OBJECT MANAGING METHOD, AN IMAGE PROCESSING APPARATUS USING SAID METHOD, AND A RECORDING MEDIA FOR PROGRAMS ACHIEVING THE SAME

BACKGROUND OF THE INVENTION

1. Field of the Invention

The present invention relates to a technology to encoding images such as mobile pictures, and in particular, to an image object managing method of managing objects configuring images by use of identifiers, an image processing apparatus using the method, an image stream produced by the method and a recording media for the stream, and a recording media on which programs achieving the method is recorded.

2. Description of the Related Art

Heretofore, there have been proposed a large number of methods of encoding or coding mobile pictures. One of these methods which is standardized by a moving picture coding experts group (MPEG) has been broadly employed in the present stage of art. The MPEG standard specifications include MPEG1 and MPEG2 at present. While MPEG1 is adopted for video compact disks (CD) and MPEG cameras, MPEG2 is utilized for digital video disks (VD) and digital satellite broadcasting. As general features of the MPEG standards, there is included data compression according to a correlation with respect to time, which leads to high coding efficiency. In this compression method, differences between a plurality of frames (screen images constituting a mobile picture) which are continuous with respect to time are recorded to compress data. In general, adjacent frames of a mobile picture are quite similar in image features to each other and hence a high compression ratio can be obtained by coding the difference therebetween. This is why the compression efficiency is improved.

New specifications of MPEG4 are being prepared or discussed at present. This is developed inherently for communication and is different in features from MPEG1 and MPEG2. Description will be, however, given of only sections of MPEG4 which relate to the present invention. MPEG4 is conspicuously different from MPEG1 and MPEG2 in an object encoding operation. According to MPEG4, each object appearing on a screen can be encoded. Consequently, it is possible that a person (an assassin) 1 and a background 2 of one film scene are respectively encoded to be also respectively transmitted, and it is possible, on a side having received the respectively transmitted signals, to combine the images into one scene. In this operation, each object is encoded, for example, as follows. Although a little change appears between successive scenes in actual mobile pictures, a large change takes place between scenes in this example for easily understanding in the description of this application.

First, an image of a person is obtained before a single-color background in a studio using, for example, a method called "blue back". Thereafter, a rectangle in which the person's image is completely contained is defined in the overall image and is trimmed as shown in FIG. 8. Using as a key the single color of the background, a mask is produced to separate the person from the background (FIG. 9). FIG. 8 is compressed by a discrete cosine transform (DCT) which is similar to ordinary MPEG2. The mask, i.e., FIG. 9 is similarly compressed. Compressed data of FIGS. 8 and 9 is transmitted to a partner (on the receiving side). The receiver decodes the data of FIGS. 8 and 9 and then recognizes that a white area of FIG. 9 is "transparent" to set the background area of the decoded FIG. 8 to "transparent" in accordance with the mask of FIG. 9 (reference is to be made to FIG. 10). Thereafter, the obtained image is combined with a background image separately prepared.

This method has a feature of higher encoding efficiency when compared with a method in which the overall screen is encoded. This is because of a principle that the background screen is almost still, i.e., little change, and hence the quantity of data to be processed is small, namely, only the moving sections of the person are to be encoded.

The present invention provides, in consideration of image compression technologies such as MPEG4 having the feature above, novel characteristics to achieve an object-base encoding operation.

A video image stream of MPEG4 includes a stream of backgrounds and streams of respective objects. FIG. 4 shows an example of MPEG4 streams corresponding to FIGS. 1 to 3.

A stream 10 includes individual object streams 11 to 19 and a control stream 20 describing a composite rule of these object screams (the description stipulates, for example, positions of images with respect to depth in the screen image and timing of appearance of images).

In FIG. 1, an assassin 1 and a background 2 are related to object streams 11 and 12, respectively. In FIG. 2, a target 3, a background 4, and a hindrance 5 are associated with object streams 13 to 15, respectively. In FIG. 3, a target 6, a background 7, an assassin 8, and a hindrance 9 are related to object streams 16 to 19, respectively. Object streams 13 and 16, 15 and 19, and 14 and 17 are not interrupted therebetween and are hence respectively continuous object streams, i.e., each combination forms one object stream.

Stream 10 is subdivided in a time division procedure into small packets to be transmitted. Consequently, for the receiving side of these object streams (and the control stream) to restore the original streams, there are required identifiers to identify the respective object streams. According to the stipulation of MPEG4, only the number of bits is determined for the assignment of identifiers and no other rules are stipulated for the identifiers. Therefore, for the identifiers, serial numbers are ordinarily assigned in an order of appearance of objects. To guarantee the time sequence of the objects, a time stamp is assigned to each object stream.

Even in a case in which objects which regarded as the same object by viewers, for example, objects corresponding to an identical person appear in different scenes, if the pertinent stream is once interrupted, a subsequent scream is ordinarily assigned with a new serial number. Namely, another number is assigned to the subsequent stream. In consequence, when at least the stream is simply analyzed by a computer, a correlation, i.e., the person appearing in two or more scenes cannot be appropriately identified.

Consequently, the prior art is attended with problems as follows.

An amateur can produce copies of video images only for curiosity or entertainment to distribute the copies via a network. Moreover, it may also be possible that a malicious person who aims at disgracing dignity of a particular person copies images of the person appearing in video images and combines the copied images with another background and other objects to produce original video images. There exists fear that such an act infringes the right of portraits of the person. Additionally, the produced screen images are not associated with intention of the producers or programs or films. Namely, there also exists fear of an infringement of a copyright. Particularly, when the user of the right is to be charged, there possibly occurs a matter of money.

When the video images are processed in the analog format or in MPEG2 and preceding digital formats, these actions do not easily occur in general because of difficulty in separating a person from a background thereof. However, since object streams can be separated in accordance with MPEG4 under discussion, the problem above may frequently arises. Therefore, a producer who provides video images in a format in which the encoding of images is carried out for objects as in MPEG4 is required to manage the copyright more strictly than in the job in which video images are encoded in MPEG or any preceding format. For this purpose, it is necessary to obtain streams of video images available in the market so as to determine whether or not particular objects exist therein. In the prior art, only the object identifiers can be used as information to identify associated objects. The identifiers are serial numbers assigned in a sequence of appearance of video images and are not associated with the contents of the objects. Namely, there is no measure for the computer to easily identify objects and hence it is impossible for the computer to retrieve particular objects. In consequence, there exists only one available method, namely, the video images are required to be visually checked by humans.

The situation above will be more specifically described by referring to FIGS. 1 to 3. These images show a scene of a film in which an assassin with a machine gun attacks his target. FIG. 1 shows a close-up image of the assassin. In FIG. 2, the attacked person is running away. FIG. 3 shows the running person and the assassin viewed from his rear side. It is assume that a cut takes place between the images respectively of FIGS. 1 and 2 and the camera pans (moves in a horizontal direction) from FIG. 2 to FIG. 3 to resultantly show the assassin in the image. In FIG. 1, assassin 1 and background 2 are related to respective objects and are therefore encoded separately. In FIG. 2, objects are produced for target 3, background 4, and hindrance 5, respectively. In FIG. 2, target 3 runs away and recognizes hindrance 5 to consequently change the running direction. In FIG. 3, assassin 8, target 6, and background 7, and hindrance 5 are associated with objects.

Since no cut exists between FIGS. 2 and 3, the same identifier is assigned to targets 3 and 6 (reference numerals 13 and 16 of FIG. 4). This is also the case of hindrances 5 and 9 as well as backgrounds 4 and 7 (reference numerals 15 and 19 as well as 14 and 17 of FIG. 4). However, a cut exists between FIGS. 1 and 2, assassins 1 and 8 are mutually assigned with different identifiers (reference numerals 11 and 18 of FIG. 4). This is also the case of backgrounds 2 and 4, i.e., there are assigned different identifiers (reference numerals 12, 14, and 18 of FIG. 4). For the producer having the copyright, assassin 1 in a scene is the same as assassin 8 in another scene. That is, for an actor of the assassin, these video images are protected in accordance with the right of his portraits. In the object-base encoding, mobile pictures of objects can be easily separated, namely, it is easy to combine assassin 1 with background 7 to create a new image. The obtained image, however, does not match intention of the film producer.

Assume now that the drawback above is removed by some measure for the computer to identify objects. A malicious person will deceive or cheat the measure. In accordance with the present invention, identifiers of objects are employed as the measure, which will be described later. In this case, a malicious person may possibly change an identifier of an object. In MPEG, no particular rule is stipulated to assign an identifier. Therefore, even if the identifier is changed, no problem occurs in the decoding phase. Namely, it is possible for the malicious person to change the object identifier. In this situation, however, the object of which the identifier is changed cannot be retrieved by the computer. Consequently, there is required a measure to detect the act of changing the identifier. This has been impossible in the prior art.

Description will now be given of a case in which a producer of programs or a user having a stream desires to create a digest or an index of the stream. This may occur that the user produces the digest or index as he or she likes or a digest is produced for a program guide or an index is created for a media title for DVD video images.

In this situation, even if it is desired to make a search or to create a database for each person in the images, since identifiers assigned to objects are not associated with such persons, it is not possible to simply search for each person in a mechanical manner. The identifiers are attended with a difficulty, in addition to the creation of a database, for an operation to select only scenes in which a favorite actor appears or to generate an index of such scenes. These jobs have been conventionally carried out by humans. However, in the present situation in which the number of video sources are remarkably increased due to, for example, multi-channels of satellite broadcasting, the method above is limited in usability and hence it has been desired to conduct the operations by machines. Particularly, when a user desires to conduct the job, it is necessary in the conventional method for the user to view the contents many times to manually mark necessary points. This requires a conspicuously large amount of human labor.

Description will now be given of simplification of video images. In a scene, for example, a mob scene (in which many people are moving), when a particular person or object is not easily identified in the scene, it maybe desired to thin out other objects to some extent to attain video images in which the particular object is clearly shown. The user may desire to view the target item concealed by an object existing in front of the item or to extract, in a weather forecast, a desired region or a desired item (e.g., only the temperature or height of waves). Specification for deletion of a particular object, for extraction of a particular object, or for deletion of all objects which conceal a particular object is to be manually conducted in the prior art. Resultantly, when objects move frequently or when many cutbacks occur in video images, the desired operation is required to be conducted for each movement or each cutback. It is therefore actually not possible to achieve the operation in a realtime fashion.

According to the circumstances above, it is not possible in the prior art to appropriately manage the copyright and the right of portraits for mobile pictures in films, television programs, DVD images in a simple method.

SUMMARY OF THE INVENTION

It is therefore an object of the present invention to remove the drawbacks of the prior art and to provide an image object managing method capable of simply achieving management of the copyright and the right of portraits in a sequence of images such as mobile pictures, an image processing apparatus employing the managing method, image streams created in the method and a recording media for the image streams, and a recording media on which a program to implement the method is recorded.

Another object of the present invention is to provide an image object managing method suitable for creating a digest and/or an index of a sequence of images such as mobile pictures, an image processing apparatus employing the managing method, image streams created in the method and a recording media for the image streams, and a recording media on which a program to implement the method is recorded.

Still another object of the present invention is to provide an image object managing method suitable for extracting a particular object from a sequence of images such as mobile pictures, an image processing apparatus employing the managing method, image streams created in the method and a recording media for the image streams, and a recording media on which a program to implement the method is recorded.

To achieve the objects above in accordance with the present invention, when a producer creates a stream of video images, it is allowed for the producer to intentionally assign an identical identifier in all video images to object streams of objects which is regarded as identical by the producer. Consequently, when a particular object is desired to be detected in the video stream, the identifier assigned to the particular object can be used as a retrieval key. Namely, the particular object can be retrieved by a computer.

Moreover, in accordance with the present invention, there is provided an image object managing method of mobile pictures and the like in which respective images appearing in backgrounds and screen images are independently encoded such that in a decoding phase, the background and screen images are decoded to be combined with each other for presentation thereof. In the method, there is provided a database which establishes a correspondence between a required condition for a data stream and an identifier of the data stream or a value obtained by conducting a mathematical operation for the identifier. When an entire stream is to be created, each object satisfying a desired condition associated with the database is assigned with an identifier corresponding to a mathematical operation satisfying a condition of the data stream, the identifier being an identifier of an object stream associated with the object. The other object streams are assigned with an identifier other than that of the object stream. When extracting from the overall stream each object stream satisfying a desired condition appearing in one scene or in a plurality of scenes, the identifier corresponding to the desired condition is used as a key for the retrieval of the object stream.

The image object managing method further includes the steps of disposing an encryption field in a subordinate field of the object stream, encrypting all or part of data of the object stream in the areas other than the encryption field including the identifier field, using as a seed an encryption key known only by a person who encrypts data; and writing encrypted data in the encryption field, extracting an identifier from data decoded using the encryption field and the encryption key. Alternatively, the method includes the steps of creating an electronic watermark using the identifier as a seed, writing the watermark in a data field of the object stream, and extracting an identifier from the electronic watermark buried in the data field. The method further includes the step of comparing the extracted identifier with an identifier in the object stream, thereby detecting modification of the identifier.

In accordance with the present invention, there is provided recording media containing a plurality of object streams recorded thereon in which each object stream includes an object identifier field, an encryption field, and a data field, and data obtained by encrypting all or part of data of the object stream in the areas other than the encryption field is recorded in the encryption field.

BRIEF DESCRIPTION OF THE DRAWINGS

The objects and features of the present invention will become more apparent from the consideration of the following detailed description taken in conjunction with the accompanying drawings in which:

FIG. 12 is a diagram showing an example of tables used to extract calculation formulae of objects;

FIG. 13 is a diagram showing an example of tables employed to extract information "region" of objects;

FIG. 14 is a diagram showing an example of tables employed to extract information "mark type" of objects;

DESCRIPTION OF THE PREFERRED EMBODIMENTS

Referring now to the accompanying drawings, description will be given of embodiments in accordance with the present invention.

First, the fundamental concept of the present invention will be described.

MPEG4 provides a new standard to compress mobile pictures and has an object compression function in which respective objects appearing in screen images, for example, persons and cars having various contours can be separately compressed to be combined with a background. When data is encoded, an identifier is assigned to each object. However, MPEG4 has no special rules for the assignment of the identifier. In accordance with the present invention, an identifier assigned to an object is regarded as unique thereto. Consequently, in an object retrieving phase, the identifier can be used as a key to easily identify the object.

Next, referring to FIG. 4, description will be given of an embodiment in accordance with the present invention.

Figure 1:
FIGS. 1 to 3 are diagrams showing an embodiment of an object encoding operation in MPEG4 for respective objects in accordance with the present invention.
Figure 2:
Figure 3:
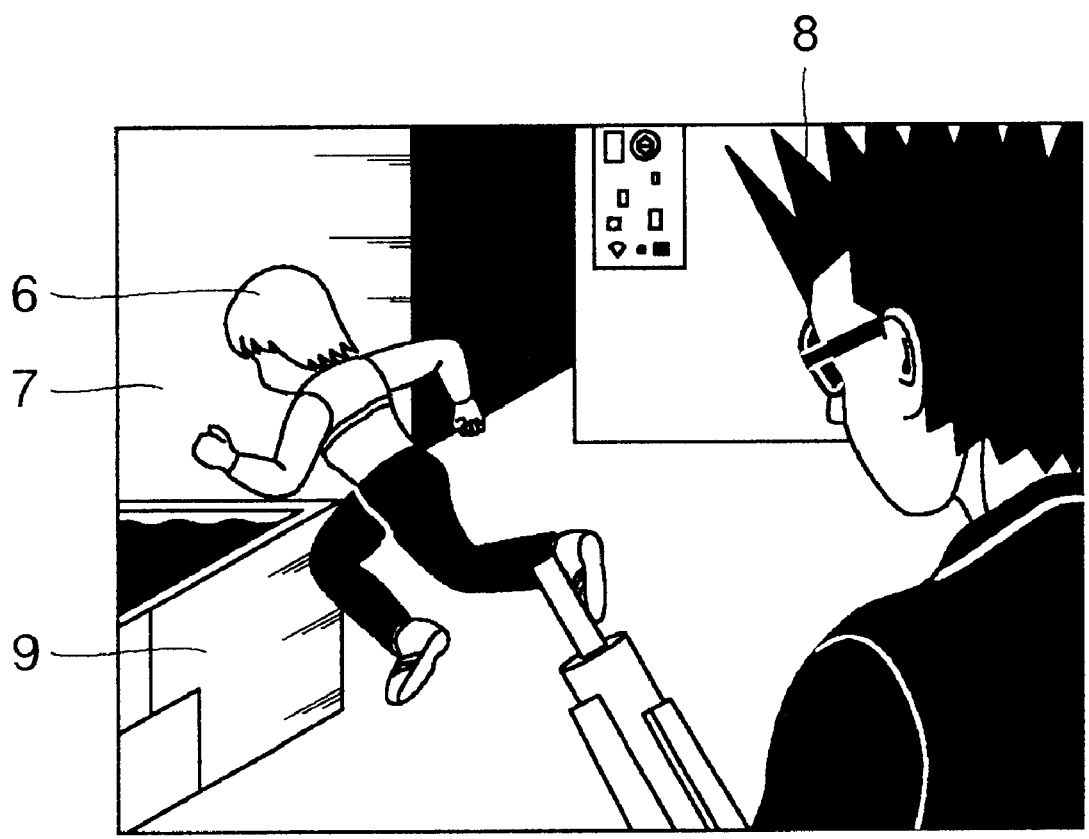
Figure 4:
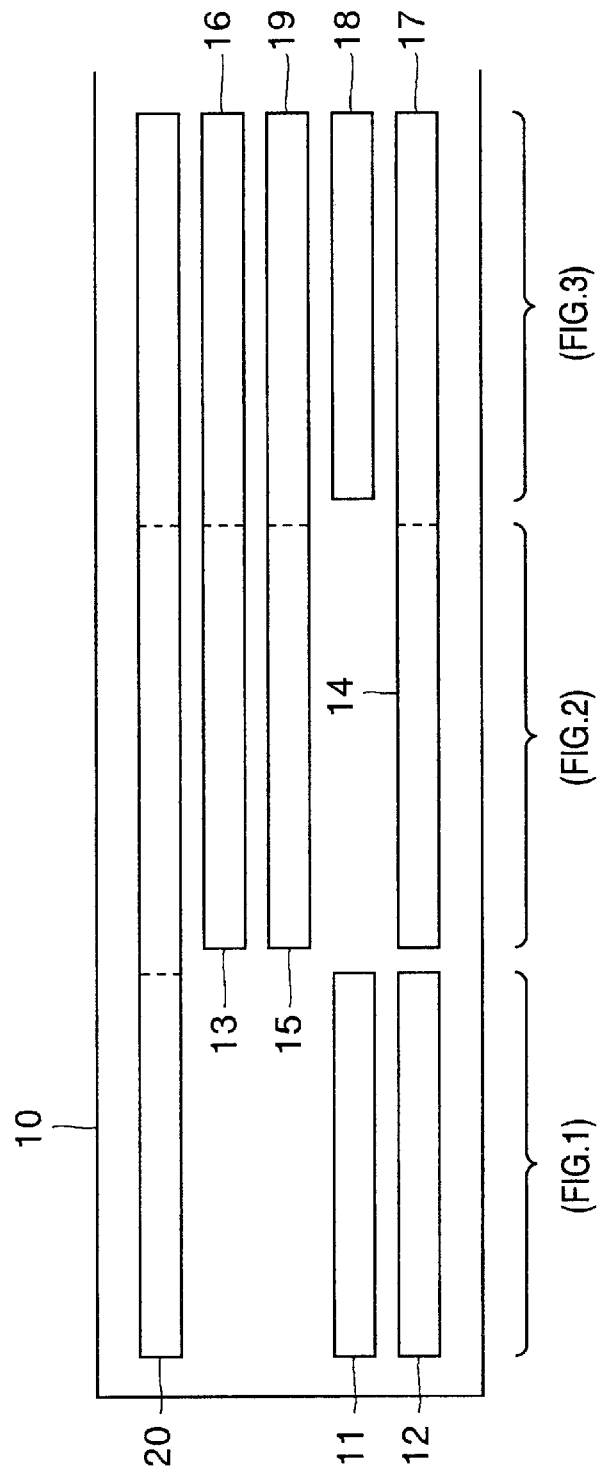
FIG. 4 is a diagram for explaining in detail of object streams in accordance with the present invention.

FIG. 4 shows an abstract image of video image streams corresponding to FIGS. 1 to 3. Stream 10 includes respective object streams 11 to 19 and control stream 20 which is a stream including descriptions of combination rules (positional relationships) between a plurality of objects and points of output timing in a time axis. This configuration also applies to general MPEG4 streams. The stream can be divided into sub-streams corresponding to FIGS. 1 to 3, respectively. Each stream proceeds in a time axis, which is represented by an abscissa, i.e., a horizontal line. In this stream, object streams 11 to 19 corresponds respectively to objects 1 to 9 shown in FIGS. 1 to 3.

An assassin is associated with object streams 11 and 18. These streams are separated from each other and hence it is not guaranteed that these streams are assigned with an identical identifier. However, these object streams are related to one person and hence are assigned with an identical identifier in accordance with the present invention. Due to the identifier, object streams 11 and 18 are interpreted to include an identical person. By applying this rule to the overall images of a film, an identical identifier is assigned to the pertinent person.

For assassin 1 of FIG. 1 and assassin 8 of FIG. 3, a copyright is possessed by one person and each object is respectively assigned with an identifier. In accordance with the present invention, however, the objects of FIGS. 1 and 3 are assigned with the same identifier. In general, it is difficult to apply the rule to all objects. Therefore, the rule is applied to objects which claim a copyright, for example, objects of a famous film star. The other objects will be assigned with sequential numbers as in the prior art. In general, an identifier will be first actually assigned by persons of an office associated with the film star. Next, description will be given of an example of the method of first assigning an identifier to objects.

For the management in accordance with the present invention, there is determined a maximum number of objets to reserve accordingly numeric values to be assigned as identifiers of the objects, the number of the objects being equal to that of the numeric values. When object streams are first created, identifiers other than the numeric values are assigned to objects. Thereafter, while visually checking object streams, operators manually rewrite the identifier (appropriately allocated in a preceding step) of each desired object stream, i.e., a desired identifier is written over the existing identifier. In this method, the automatically assigned identifiers and the manually assigned identifiers are separately and appropriately allocated to the object streams. It is possible to suppress a disadvantage in which an identifier already assigned is allocated to another stream appearing in one screen. There may be used an image recognition technology to evaluate a feature and a degree of similarity between images to automatically assign identifiers to objects. Even in such a case, the computer need only evaluate and determine each desired object stream, and the other necessary operations can be achieved in accordance with the algorithm of the present invention. Furthermore, in accordance with a recognition ratio of the image recognition technology, the automatic identifier assignment through image recognition may be combined with the manual identifier specification of operators such that results of the image recognition are confirmed by humans.

FIG. 4 shows in a simple diagram sequences of objects in respective streams. Stream 10 includes streams 11 to 19 of various objects. The respective streams are appropriately combined with each other for representation thereof in a time axis. There is also provided control stream 20 to supervise the combining procedure (e.g., positional relationships with respect to depth of the screen image).

Basically, an identifier is actually stored in an object identifier field stipulated by MPEG4. An object stream area is subdivided into a data field, an identifier field, an subordinate field, etc. If the object identifier field of MPEG4 is insufficient for the number of figures, it is possible to use a field (not reserved) defined as a field for expansion or extension of object attributes in the future. However, when the subordinate field is used to define the identifier, there takes place a drawback, for example, an access to the subordinate field takes a long period of time. Therefore, if possible, the identifier stored in the object identifier field desirably includes its own meanings.

Description will now be given of a method of retrieving a particular object in accordance with the present invention.

Figure 11:
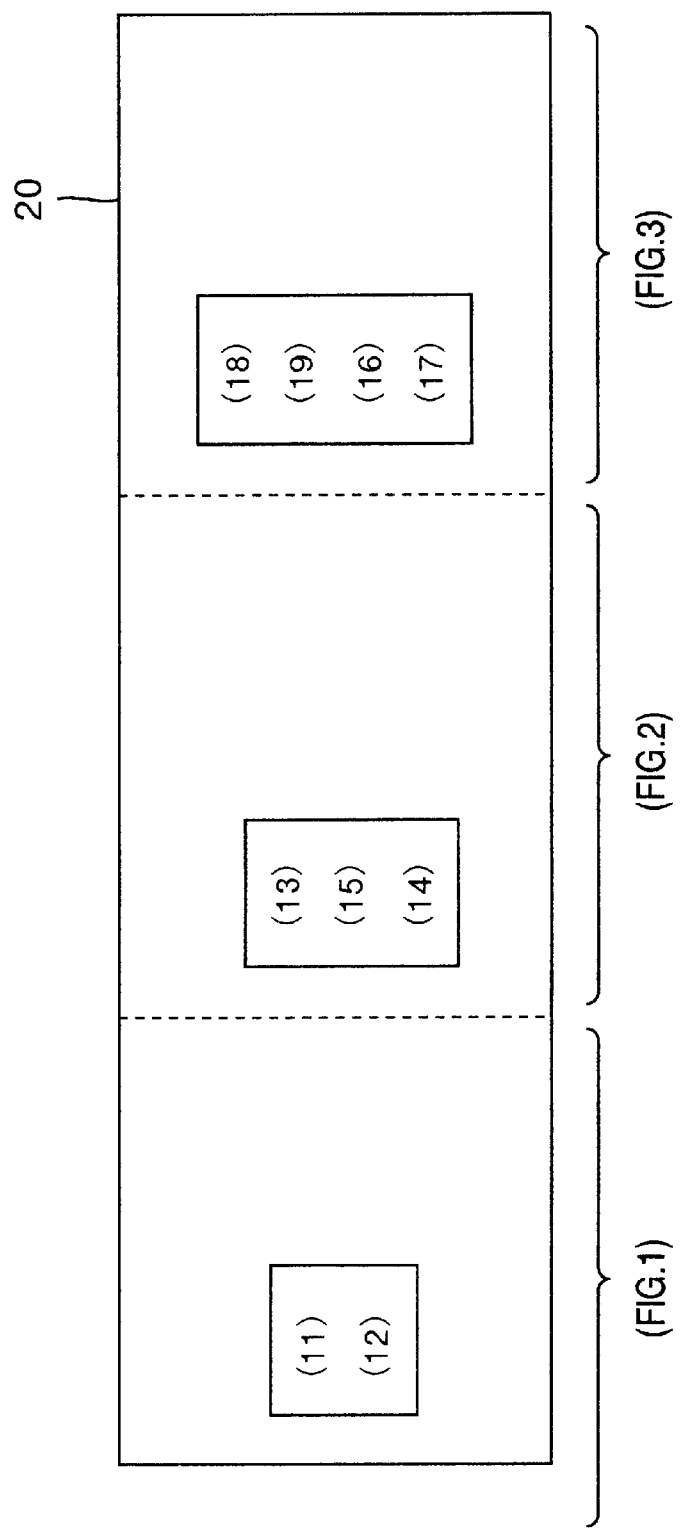
FIG. 11 is a diagram for explaining control stream 20.

As can be seen from FIG. 4, control stream 20 extends to cover all other streams. FIG. 11 shows details of control stream 20 including a few data items. Numbers (11) and (12) on the left-hand side (corresponding to FIG. 1) express that object stream 11 (assassin 1) is placed at the nearest position to viewers and object stream 12 (background 2) is placed behind object stream 11. Numerals (13), (15), and (14) similarly means that object stream 13 (target 3) is at the nearest position to viewers and object stream 15 (hindrance 5) and object stream 14 (background) are placed behind the others in this sequence. Numerals (18), (19), (16), and (17) at a position of last timing (associated with FIG. 3) indicate that object stream 18 (assassin 8) is at the nearest position to viewers and object stream 19 (hindrance 9), object stream 16 (target 6), and object stream 17 (background 7) are placed behind the other streams in this order.

The contents of control stream 20 are represented in a quite simple manner, i.e., identifiers of object streams appear at appropriate timing. Therefore, it is a feature of the control stream that the data volume thereof is considerably reduced when compared with other object streams including a large amount of mobile picture data. Consequently, when only the control streams are extracted to be stored in a database in a storage, it is possible to know points of timing of appearance of a desired object in a screen only by conducting an information retrieving operation through the database. Since necessary objects are assigned with an identical identifier in accordance with the present invention, it is necessary to conduct a search only through control streams 20 to retrieve scenes in which a necessary object, e.g., a particular film star (assassin 1 or 8) appears in the example above.

Figure 6:
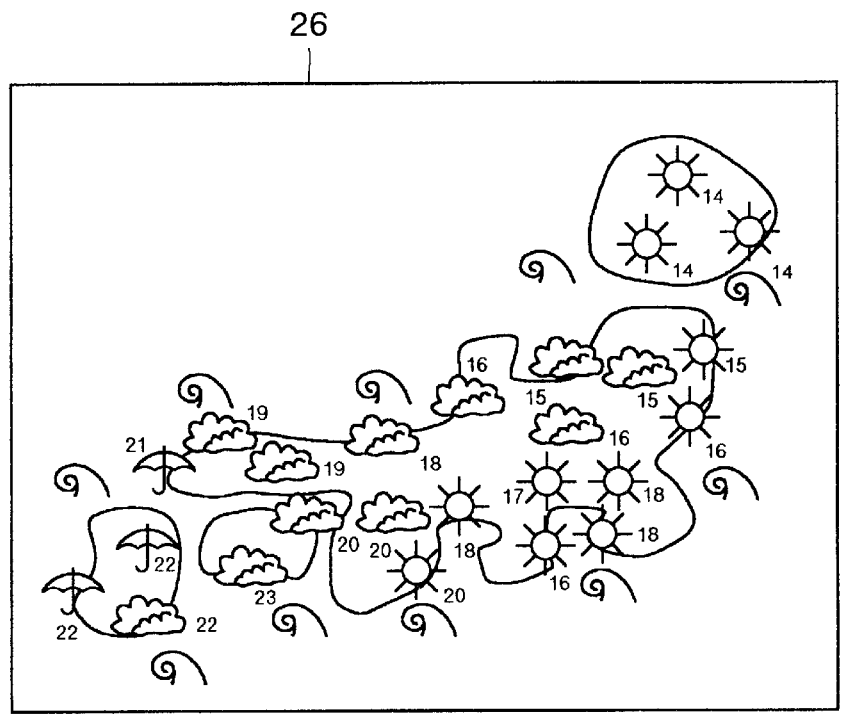
FIG. 6 is a diagram for explaining an example of extraction of objects in accordance with the present invention.
Figure 6:
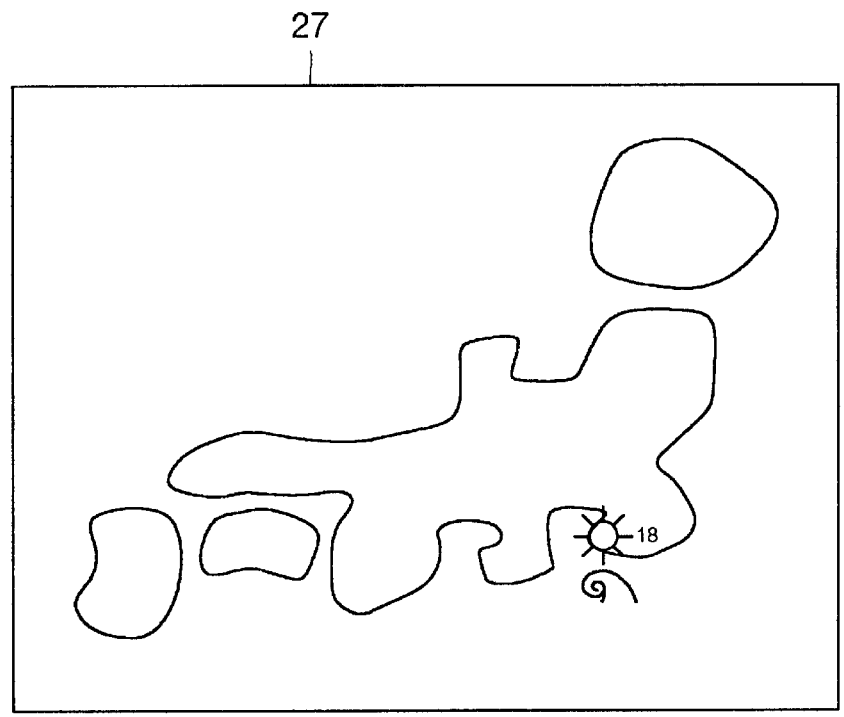

Referring now to FIG. 6, description will be given of an example in which objects having a specified meaning are extracted from a large number of objects by use of meanings of identifiers so as to thereafter display the extracted objects.

FIG. 6 shows an example of a map used in a weather forecast. This example includes a complex weather map 26 and a simple weather map 27. When a weather map is transmitted in accordance with MPEG4, the map is represented by data associated with an object of a background representing a map and objects, for example, of weather marks (clear, rain, cloudy, etc.), values of temperature (maximum and minimum values), and height of waves for each region of the map. When all of these items are displayed in an ordinary weather forecast, the screen image of complex weather map 26 becomes complicated and cannot be easily understood. Consequently, weather information is respectively broadcast in a time axis, for example, only the weather is first broadcast and then only the values of temperature are transmitted. However, ordinarily, viewers do not require the weather of the all regions of Japan, namely, viewers want to generally know weather information of a region in which they live or regions to which they are going. To obtain such information in the conventional methods, viewers are required to watch the entire weather forecast and hence there is required a long period of time.

In accordance with the present invention, by uniformly assigning an identifier to each region, it is possible to attain all information items of a particular region. In simple weather map 27, the weather and temperature are displayed only for the Kantō region. Namely, only the information items of Kantō are extracted for the display thereof in accordance with a particular rule applied to an identifier of objects. Specifically, a particular number, e.g., a remainder obtained by dividing an identifier by seven is associated with the identifier such that Hokkaido is associated with identifiers having a remainder of 1 and Tōhoku is associated with identifiers having a remainder of 2, and so forth. In this fashion, Kantō is related to identifiers with a remainder of 3. In simple weather map 27 of FIG. 6, the items retrieved in association of the identifiers with a remainder of 3 are displayed.

It may also be possible to establish a correspondence between a quotient and a type of weather information. For example, identifiers having a quotient of 0 in the method above are assigned to whether marks, identifiers having a quotient of 1 are assigned to temperature, and so forth. Resultantly, it is possibly to display only the weather information or only the temperature values. The quotient and the remainder may be combined with each other to extract desired information items only for the Kanto region. If these operation modes are selected by the user, the user can immediately obtain desired information at a glance. When it is desired to extract information for a combination of "Kanto" and "whether and temperature", the user need only select a combination of identifiers "3" and "4" for which the remainder is 3 and the quotient is 0 or 1.

The procedure will now be more generally described by referring to a flowchart.

Figure 7:
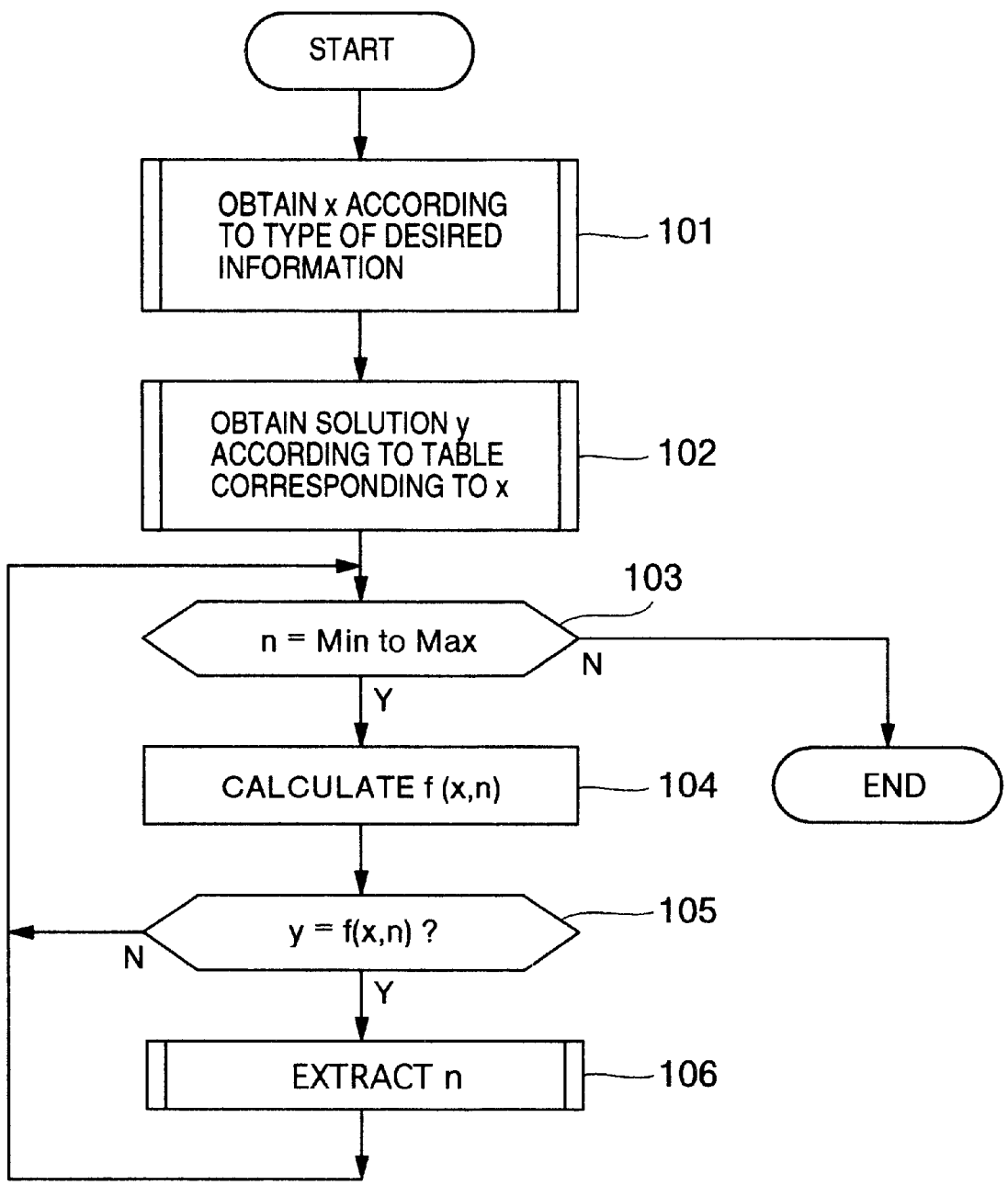
FIG. 7 is a flowchart for explaining an algorithm to extract objects in accordance with the present invention.
Figure 8:
FIG. 8 is a diagram for explaining an original image of an object in MPEG4 compression.
Figure 9:
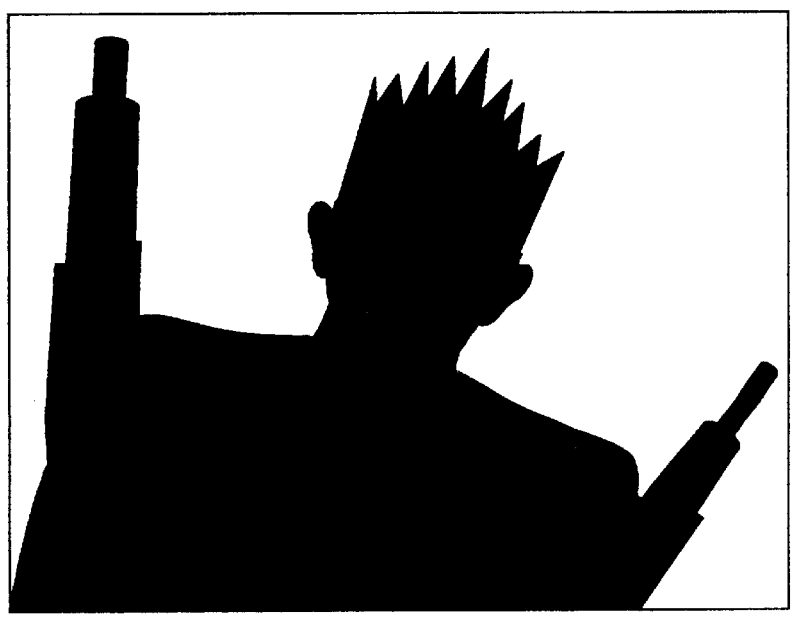
FIG. 9 is a diagram for explaining a mask for the object in MPEG4 compression.
Figure 10:
FIG. 10 is a diagram for explaining an image after processing of a background for the object in MPEG4 compression.

FIG. 7 shows in a flowchart an algorithm to achieve the method above. For identifier n, there exist a plurality of calculation formulae depending on types of desired information to be extracted. Assume that one variable x is assigned to each type of information. Then, two kinds of expressions exists for f(x,n) for a region (x=1) and weather (x=2). FIG. 12 shows a correspondence in this case. Namely, f(1,n) Mod(7,n) represents a remainder of n/7 and f(2,n)= Quotient(7,n) designates an integer part of the quotient of n/7. Information toe be extracted for x=1 is "region", which is specifically shown in an example of FIG. 13. Information desired for x=2 is "mark type", which is concretely shown in an example of FIG. 14.

To extract only desired information, the user first attains x according to the kind of information to be extracted (step 101) and then a solution y from a table corresponding to x (step 102). For each n, f(x,n) is calculated (steps 103 and 104) to determine whether or not f(x,n) is equal to y (step 105), and only if f(x,n)=y, n is extracted (step 106). In the example of FIG. 13, the remainder of f(1,n)=Mod(7,n) indicates a region, specifically, the remainder of "1", "2", "3", "4", "5", "6", and "0." denote Hokkaidō, Tōhoku, Kantō, Chūbu, Chūgoku, Shikoku, and Kyūshū, respectively. In the example of FIG. 14, the quotient of f(2,n)=Quotient(7,n) designates weather information, concretely, the quotient of "0", "1", and "2" indicate the weather mark, the temperature, and the wave mark.

Thanks to provision above, the user can extract a desired object of a plurality of desired objects from a large number of mobile picture objects; moreover, the user can select only desired information from complicated screen images. Since the user can extract desired objects from screen images, information transmitted in a time division scheme in the prior art for simplification of screen images can be sent at a time. This makes it possible to save time.

Finally, description will be given of an embodiment of a method of preventing an event in which a third person with a malicious intention illegally changes an identifier. When such a third person attempts to extract a particular object stream for an illegal purpose, for example, to plagiarize the stream, it is technically easy for the third person to simply pass the check above by changing only the identifier. To prevent such an action, a technology of encryption is adopted in this embodiment, namely, there is provided a mechanism to check the changing of the identifier in this example.

An object stream area includes a plurality of fields which are generally classified into data, identifier, and subordinate fields. In the subordinate field is written, for example, an attribute of the pertinent stream, which does not directly exert influence on the decoding of data. Information written in this field is used later, for example, by the user to further process objects by a computer. For example, indication of a copyright is stored in the subordinate field. In general, are served field is provided. In accordance with MPEG4, it has already been determined to define a reserved field for use in the future.

Figure 5:
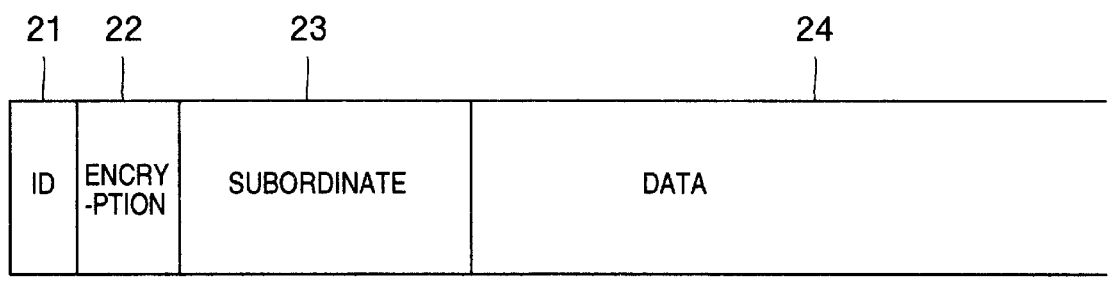
FIG. 5 is a diagram for explaining in detail of encryption in accordance with the present invention.
Figure 5:
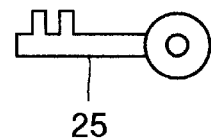

FIG. 5 shows a format of an object stream used in this embodiment. The format includes an identifier filed 21 to identity the object stream, an encryption field 22, a subordinate field 23, and a data field 24. A person who encrypts data selects all of or part of subordinate field 23, data field 24, and identifier field 21 and encrypts the selected items using a secret encryption key 25 known only by himself or herself and stores or buries the resultant data in encryption field 22.

When attempting an illegal action for data in the object stream format, it is necessary for a malicious third person to change the contents of identifier field 21 so as to thereafter write an appropriate encryption in encryption field 22. However, even if data of subordinate field 23 and data field 24 is known, it is technologically quite difficult to obtain the encryption key in encryption key field 25 using the data. Namely, an appropriate encryption cannot be produced on the basis of the new identifier in identifier field 21.

When checking any illegal action for the encryption, the person who encrypts data generates encrypted data using data of identifier field 21, subordinate field 23, data field 24, and encryption key field 25 to compare the obtained data with that stored in encryption field 22. If these items match each other, it can be assumed that there exists no illegal action. Otherwise, it is assumed that an illegal action has been achieved. Using this operation, the encryption generating person who strictly manages the copyright can make a check to determine presence or absence of an illegally created object stream. On the side of the copyright holder, an identifier not generally used, e.g., a large value of 255 if the identifier includes eight bits, is assigned to an object associated with a copyright.

In this method, however, when the encryption field itself is deleted, information of the encrypted identifier in identifier field 21 becomes also unknown. That is, the method is incomplete that the deleted state cannot be discriminated from a state not encrypted.

A plurality of object streams shown in FIG. 4 are particularly useful for satellite digital broadcast. However, the object streams may be recorded on a recording media such as a DVD or a CD-ROM to be put to the market. In such a case, each object stream includes object identifier field 21, encryption field 22, data field 24, etc. as shown in FIG. 5. All or part of the object stream data other than that of encryption field 22 (such as values of the identifier and data fields) is encrypted to be stored in encryption field. Thanks to this operation, when the identifier is altered, the action of alteration can be immediately detected and hence any illegal use of a copyright can be examined.

Description will now be given of a method in which an electronic watermark is adopted in relation to the encryption.

Utilizing identifier field 21 and encryption key 25 of FIG. 5, an digital watermark is created for data field 24 in accordance with a digital watermarking technology. Namely, the data is modified and an encryption is inserted therein such that the data field containing resultant data, e.g., data of images and voice is not strictly equal to the original data. However, when the resultant data is decoded and is viewed or is heard by a human, it is almost impossible to detect the difference between the recorded data and the original data. In general, there is employed a method of spread spectrum. In the method using the digital watermark, identifier field 21 can be restored from data field 24 and encryption key field 25 by using data field 24. The restored data is compared with the current identifier. If these items match each other, it can be assumed that the identifier is kept unchanged. In this method, information of the encrypted data in identifier field 21 can be deleted from the data stream only with the key of encryption key field 25, ensuring safety of the system.

Description will be given in detail of a method of encryption using an digital watermark.

Figure 15:
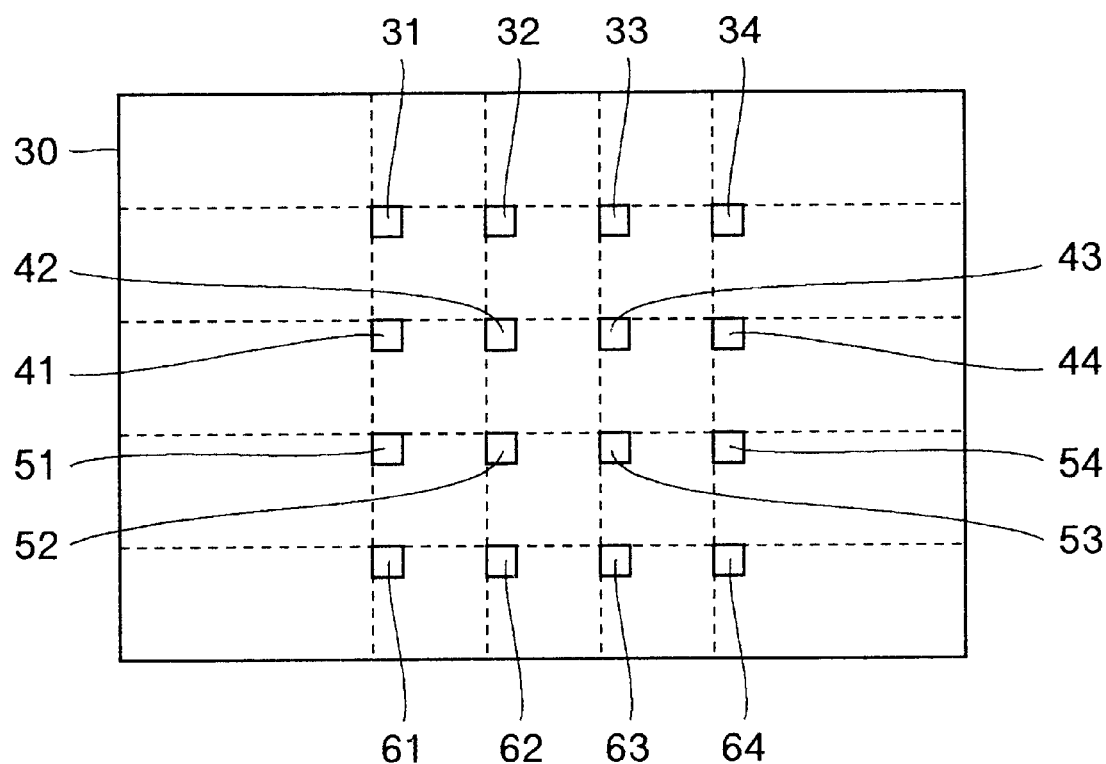
FIGS. 15 and 16 are diagrams for explaining a principle of an electronic watermark.
Figure 16:
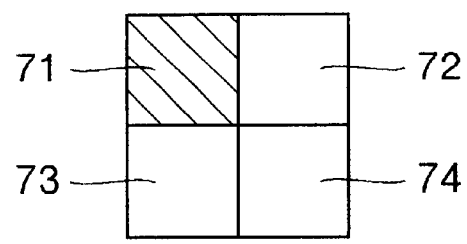

The watermarking encryption is an encryption method in which data of images and voice in the data field is modified such that the change is not perceivable for humans and information of the data field is stored as encrypted data. FIGS. 15 and 16 are diagrams for explaining the principle of the watermark. As can be seen from FIG. 15, a plurality of particular position are set in a screen area 30 to determine an image area of an appropriate size at each position. This example includes particular points 31 to 34, 41 to 44, 51 to 54, and 61 to 64. Each particular point is assumed to be represented by a 2-bits by 2-bits area. FIG. 16 shows a layout of the particular point.

In general, in an overall image area, adjacent points are characteristically of similar colors. In FIG. 16, therefore, it is to be assumed that point 71 of an upper-left area is almost the same in color with other points 72 to 74. To insert or to bury information in this image, the color of only point 71 is slightly altered. For example, to bury information "1", two is added to the value of each of red (R), green (G), and blue (B). To bury information "0", two is subtracted from the value. In the operation, if the value to be added or subtracted is too small, the buried information cannot be discriminated from noise. If too large, the point becomes conspicuous. Therefore, the range of modification is required to be determined in consideration of these conditions.

When the processing is executed only for a single particular point, the resultant value may appear by chance. Namely, whether the value is an accidental value or is resultant from the processing above cannot be determined. Consequently, the processing is achieved for a plurality of particular points. For example, all particular points 31 to 34 of FIG. 15 are processed for this purpose. It is assumed that values of these points, i.e., four points represent one-bit information. Consequently, when the processing is conducted for particular points 41 to 44, 51 to 54, and 61 to 64, four-bit information can be buried in the image. To bury more information in the image, the number of particular points is increased or the processing is conducted for a plurality of frames to disperse information with respect to time.

To extract the watermark, it is only necessary to invert the processing above. That is, an image is first obtained, data of the particular points are read therefrom, and a check is made for a color difference between upper-left point 71 and the other points. If there are found three of more horizontal points (e.g., points 31 to 34) in which "two or more" is added to the value of each point, it is assumed that information "1" has been inserted therein. If there are found three of more horizontal points (e.g., points 31 to 34) in which "two or more" is subtracted from the value of each point, it is assumed that information "0" has been inserted therein. This operation is repeatedly achieved for the respective horizontal lines and for a plurality of frames if necessary.

In accordance with the principle above, data can be buried in image data and the buried data can be read therefrom. When an identifier is inserted in this method, data can be buried without using an extended field. Even if part of the image is slightly altered, the encryption cannot be completely erased. Consequently, the encryption field can be extracted from the remaining image to thereby read the identifier data therefrom. By comparing the obtained data with that stored in the identifier field, whether or not the data has been modified can be determined. If the watermark is not originally provided, "information missing" is determined.

It is to be appreciated that any one of various watermarking technologies may be used without deteriorating the advantageous effect of the present invention.

Description will now be given of a hierarchy of streams.

Figure 17:
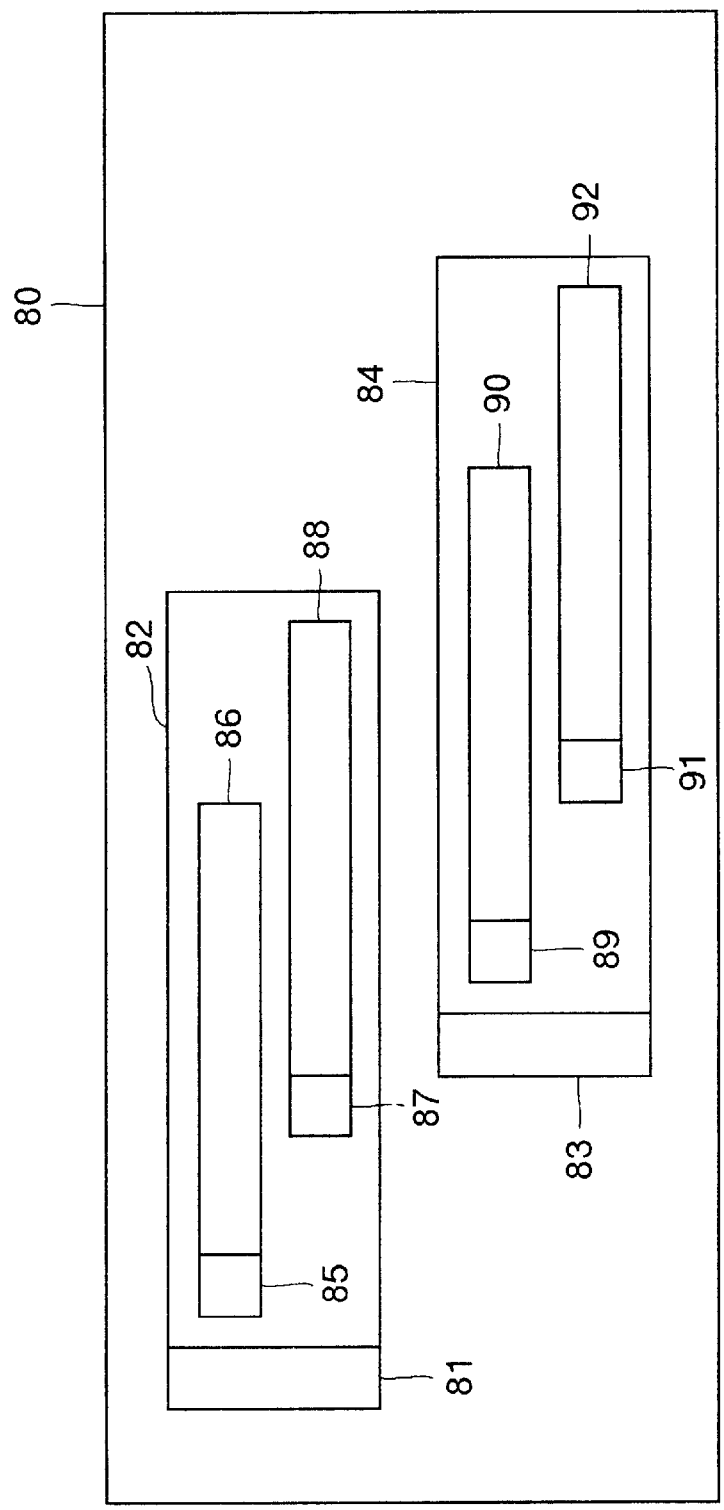
FIGS. 17 and 18 are diagrams for explaining a hierarchy of streams.
Figure 18:
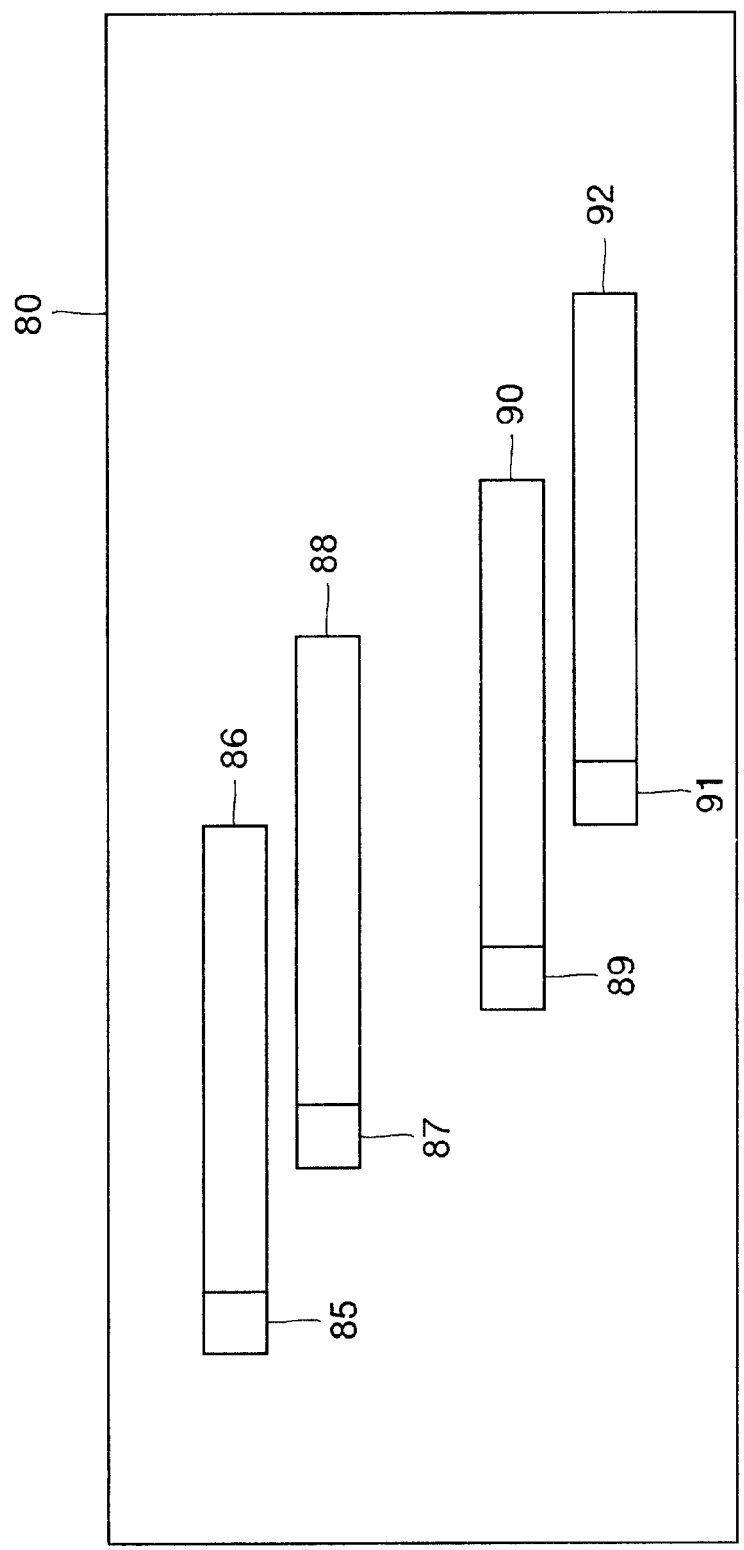

Streams can be configured in a hierarchy in accordance with the standard of MPEG4 currently under discussion. FIGS. 17 and 18 schematically show a hierarchic layout of streams. As can be seen from FIG. 17, a stream 80 includes streams 82 and 84. Streams 82 and 84 include identifier and extension fields 81 and 83, respectively. Stream 82 includes object streams 86 and 88, which include identifier and extension fields 85 and 87, respectively. Stream 84 includes object streams 90 and 92, which include identifier and extension fields 89 and 91, respectively. When the streams are configured in a hierarchic structure, objects can be classified into groups. The hierarchic structure facilitates operations to edit and to retrieve objects in a screen image including many objects.

If the present invention is applied to streams 82 and 84, when a new stream 93 is created by subdividing streams, identifier and extension fields 81 and 83 attached to the streams are deleted regardless of use of the extension field or the digital watermark. Namely, the advantageous effect of the present invention is removed. To prevent such a disadvantage, it is assumed in accordance with the present invention that when objects are configured in a hierarchic structure, a lower-most hierarchy is encoded, i.e., object streams 86, 88, 90, and 92 are encoded in this example. Since there exists no fear of deleting the identifier and extension fields, the present invention is particularly effective.

As above, the copyright and the right of portraits can be easily managed in accordance with the present invention. The present invention also provides durability against modifications. Objects having a particular meaning can be simply extracted. In accordance with the present invention, MPEG4 currently being discussed can be accepted without any conflict, it is hence not required to expand or to change the MPEG4 standards.

Although description has been given of embodiments for mobile pictures in the MPEG4 format, it is obvious that the present invention is applicable to any image or video systems in which objects of images are managed according to identifiers.

The present invention includes primary sections which are supplied in the form of software programs for information processing apparatuses such as personal computers and/or for apparatuses dedicated to image processing, e.g., non-linear editing apparatuses. The programs are stored on recording media such as a DC-ROM and are installed therefrom into the apparatuses above. The programs may be supplied from a server computer via a network to be down-loaded or installed in the apparatuses.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image object managing method for use with an image processing system in which objects constituting image frames are respectively encoded to generate object streams and the encoded object streams are decoded in a decoding phase to combine the objects for presentation thereof, comprising the steps of:

displaying a screen for assigning an identifier to an object of a first object stream constituting an image stream on a display;

assigning, in response to specification from an operator, the identifier common to an object of a second object stream to the object of the first object stream displayed on the display;

disposing a database establishing a correspondence between desired conditions for an object stream and an identifier of the object stream or a value obtained by conducting a fixed mathematical operation for the identifier;

assigning, when creating an overall stream, to an object having a desired condition corresponding to the database an identifier corresponding to a mathematical operation satisfying the condition of the database;

assigning identifiers other than the identifier to other object streams; and retrieving, when extracting from the overall stream an object stream satisfying a desired condition and appearing in one or more scenes, the object streams by setting the identifier corresponding to the desired condition as a retrieval key.

2. An image object managing method in accordance with claim 1, further comprising the steps of:

reserving a predetermined number of identifiers specified by the operator;

assigning, when first creating the object stream, identifiers other than the reserved ones to respective objects of the object stream; and assigning, in response to specification from the operator, again either one of the reserved identifiers to an object specified by the operator.

3. An image object managing method in accordance with claim 1, further comprising the step of interactively issuing a request of specification from the operator, via an input device, to the object stream presented on the display.

4. An image object managing method in accordance with claim 1, further comprising the steps of:

making the operator in the specification from the operator to specify an object for specification and an identifier to be assigned to the object;

extracting the specified object from an object stream constituting an image stream in accordance with a degree of similarity of images; and assigning an associated identifier to the extracted object.

5. An image object managing method in accordance with claim 1, further comprising the steps of:

extracting data related to the specified identifier from a control stream in an image stream; and retrieving, with a key set as an identifier, a desired object using the extracted data.

6. An image object managing method in accordance with claim 1, further comprising the steps of:

disposing an encryption field in a subordinate field of the object stream;

encrypting all or part of data of the object stream in the areas including an identifier field other than the encryption field, using as a seed an encryption key known only by a person who encrypts data;

writing encrypted data in the encryption field;

extracting an identifier from data decoded using the encryption field and the encryption key; and comparing the extracted identifier with an identifier in the object stream, thereby detecting modification of the identifier.

7. An image object managing method in accordance with claim 1, further comprising the steps of:

creating a digital watermark using the identifier as a seed and writing the watermark in a data field of the object stream;

extracting an identifier from the digital watermark buried in the data field;

comparing the extracted identifier with an identifier in the object stream, thereby detecting modification of the identifier.

8. An image object managing method in accordance with claim 1, wherein the displaying step displays the object streams to be assigned with the identifiers on the display.

9. An image object managing method in accordance with claim 1, wherein one image frame does not include the object of the first object stream and the object of the second object stream at the same time.

10. An image object managing method in accordance with claim 1, further comprising the steps of:

matching the identifier with a requisite of the object stream; and wherein when generating the image stream, assigning the identifier to the object streams representing the object satisfying the requisite and assigning other identifiers to other object streams.

* * * * *